(12) United States Patent
Blott et al.

(10) Patent No.: US 10,735,660 B2
(45) Date of Patent: Aug. 4, 2020

(54) METHOD AND DEVICE FOR OBJECT IDENTIFICATION

(71) Applicant: Robert Bosch GmbH, Stuttgart (DE)

(72) Inventors: Gregor Blott, Salzgitter (DE); Robert Borchers, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/267,901

(22) Filed: Feb. 5, 2019

(65) Prior Publication Data
US 2019/0246041 A1 Aug. 8, 2019

(30) Foreign Application Priority Data

Feb. 7, 2018 (DE) .................. 10 2018 201 909

(51) Int. Cl.
*H04N 5/232* (2006.01)
*H04N 5/235* (2006.01)
*G06K 9/00* (2006.01)
*G06K 9/62* (2006.01)

(52) U.S. Cl.
CPC ..... *H04N 5/23299* (2018.08); *G06K 9/00624* (2013.01); *G06K 9/6256* (2013.01); *G06K 9/6262* (2013.01); *H04N 5/232* (2013.01); *H04N 5/235* (2013.01)

(58) Field of Classification Search
CPC .... H04N 5/23299; H04N 5/235; H04N 5/232; H04N 7/18; H04N 9/735; H04N 5/357; H04N 9/64; G06K 9/00624; G06K 9/6256; G06K 9/6262; G06K 9/20; G06K 9/6271
See application file for complete search history.

(56) References Cited

U.S. PATENT DOCUMENTS

2019/0019335 A1* 1/2019 Elangovan .............. G06T 19/20

FOREIGN PATENT DOCUMENTS

DE      102009055127 A1    6/2011

* cited by examiner

*Primary Examiner* — Nam D Pham
(74) *Attorney, Agent, or Firm* — Norton Rose Fulbright US LLP; Gerard Messina

(57) ABSTRACT

A method for object identification is described, the method initially including a step of reading in, in which input data signals, as well as a determined camera control parameter for adjusting a recording feature of a camera are read in. The input data signals in this case represent the images of the object to be identified that are recorded by at least one camera. Finally, the method includes a step of identification, in which the object is identified in a neural network using the determined camera control parameter.

18 Claims, 4 Drawing Sheets

METHOD AND DEVICE FOR OBJECT IDENTIFICATION

FIELD OF THE INVENTION

The present invention is directed to a device or to a method according to the definition of the species in the independent claims. The subject matter of the present invention is also a computer program.

BACKGROUND INFORMATION

Devices are known which identify and classify objects with the aid of neural networks.

German Published Patent Application No. 10 2009 055 127 A1 describes a video monitoring system for detecting and tracking a conspicuous object, the object being detected with the aid of a detection device based on a predefined model description and being tracked over a particular period of time by a tracking device, the tracking device detecting a plurality of tracking parameters and being coupled back to the detection device, so that during repeated detection, the tracking parameters are fed to the detection device and are taken into account for detecting the object. The video monitoring system is optionally designed as a learning or self-learning system.

SUMMARY

Against this background, a method for object identification, furthermore, a device which uses this method, and finally a corresponding computer program according to the main claims is presented with the approach presented herein. Advantageous refinements of and improvements on the device specified in the independent claims are possible as a result of the measures cited in the dependent claims.

A plurality of input data signals is extended using a camera control parameter for an object identification taking place with the aid of an artificial neural network in such a way that an improved identification and/or recognition of objects and/or persons is possible, which is of major importance, in particular, for the subject areas of autonomous driving and of safety monitoring.

A method for object identification is presented, the method including the following steps: reading in at least one input data signal, the input data signal representing an image of an object that is recorded by at least one camera, as well as a specific camera control parameter assigned, in particular, to the at least one input data signal 145 for adjusting a recording feature of the camera; and identifying the object using the specific camera control parameter and, in particular, using the at least one input data signal in a neural network.

An object may be, for example, a person to be identified and/or a vehicle to be identified. A camera may be a photo-technical apparatus that records static or moving images on a photographic film or electronically on a magnetic video tape or digital memory medium, or is able to convey them via an interface. The camera may be, in particular, a surroundings sensor camera, which is mounted on a vehicle and is designed to continuously detect and provide image information or images of vehicle surroundings. Alternatively, the camera may be a monitoring camera of a camera network, which is used to observe a monitoring area and is designed to track a conspicuous person situated in the monitoring area and to forward image sequences and/or video sequences of this person to a central unit. A camera control parameter may be a control parameter for adjusting a recording feature of the camera, the camera control parameter being applied or adapted to an image recorded by the camera with respect to illumination, contrast, color reproduction, aperture opening, gain and/or pixel errors and/or a piece of information about a color correction (tone mapping) and/or a frame repetition rate and/or a piece of information about an exposure time and/or an analog-digital converter adjustment and/or a piece of information about a white balance and/or an infrared filter adjustment and/or a focus adjustment and/or a piece of information about a chronological noise filtering (noise reduction). A neural network may be an artificial abstraction model of the human brain, made up of a plurality of layers having artificial nodes, of a type of neurons. The neural network in this case may have, in particular, an input layer and an output layer, between which multiple intermediate layers may be situated. The nodes of the input layer may be linked through training to the nodes of the output layer via the nodes of the intermediate layers in a number of ways. Here, the rule is, the more nodes and layers the neural network includes, the more complex the facts are that may be reflected.

The advantages of the method approach presented herein lie, in particular, in the fact that the object identification with the aid of a neural network may be used both in video-based monitoring technology as well as in the automotive field. In video-based monitoring technology, a neural network, by determining a camera control parameter for the purpose of active camera control, may be trained in such a way that an available data volume regarding a detected person is artificially enhanced in a monitoring area. On the basis of this artificially enhanced data volume, it is possible to generate more robust and illumination-invariant features for person recognition. As a result, a detected person may be tracked seamlessly, for example, by an entire camera network, without the identity of the person being lost or the person being confused with another tracked person. An object identification with the aid of neural networks is suitable in the automotive field, in particular, for the subfield of autonomous driving, for automatically identifying objects, such as stop signs and traffic lights, in road traffic. Moreover, the method approach presented here may be advantageously used in the automotive field in order to identify pedestrians and, therefore, to avoid accidents. The number of available cameras in the fields of video-based monitoring technology, and in the automotive field, is numerable. Due to the manageable number of cameras, it is known, in particular, how these cameras operate in terms of control technology. The camera control is of great importance in order to be able to use the parameters for an efficient mechanical scene interpretation. The aim is to render the utilization of a neural network for object identification more robust by using camera control and to enable a real world identification, in particular, for autonomous driving.

According to one specific embodiment, the camera control parameter for adjusting a recording feature of the camera using the majority of read-in images of the object may be determined in a step of determining, the particular camera control parameter for reading in at least one additional input data signal being applied, in particular, in the step of reading in. In this case, the camera control parameter is used primarily for adapting the recorded image or the image to be recorded of a person and/or of an object to the instantaneously measured lighting conditions of the recorded scene or of the scene to be recorded, and to adapt exactly this as a function of lighting conditions to be expected in the future. The various requirements in the case of rapidly changing scenes are optimally met by a predictive control of cameras with the aid of the camera control parameter.

According to one specific embodiment, a brightness and/or a contrast and/or a color reproduction and/or an aperture opening and/or a gain and/or a piece of information about a color correction (tone mapping) and/or a frame repetition rate and/or a piece of information about an exposure time and/or an analog-digital converter adjustment and/or a piece of information about a white balance and/or an infrared filter adjustment and/or a focus adjustment and/or a piece of information about a chronological noise filtering (noise reduction) and/or a pixel error may be used as the camera control parameter in the step of reading in. An increase of data variability is achieved by applying or adapting the recorded image or image to be recorded of a person and/or of an object with respect to illumination, contrast, color reproduction, aperture opening, gain and pixel error, which results in an improved identification of persons and/or of objects, and also recognition of persons and/or of objects by a neural network. To date, an attempt has been made with the aid of presently available cameras to reproduce, in the best way possible for humans, a scene to be reproduced. The focus in this case has been the optimization for the human eye, not for an artificial intelligence, for example, a neural network. As a result, however, optimizations in the image are deliberately tolerated which, though they help humans, offer no advantage from the perspective of the self-learning machine. Tone mapping, for example, may be named as one, the task of which is merely to adapt the contrast/dynamic range in the image as maximally as possible for humans.

According to one specific embodiment, the camera control parameter may be coupled in the step of reading in to a node from a first half of layers and/or to a node from a second half of layers of the neural network. The neural network includes a plurality of nodes, which are arranged in layers and are generally connected to one another in a fixed hierarchy. The nodes in this configuration are connected for the most part between two layers, in rarer cases however, also within one layer. Between the layers, each node of the one layer is also always connected to all nodes of the next layer. Starting with the input layer, for example, image information flows via one or multiple intermediate layers all the way to the output layer. In the end, the outputting layer has learned which visual characteristics and features make up an object, for example, a vehicle and/or a person.

According to one specific embodiment, each pixel of an image that forms the input data signal may be read in a 565 format in the step of reading in, the pixels being processed in the 565 format in the step of identification. Processing systems frequently interpolate while they process the pixels of the input data signals in an 888 RGB format. For the so-called "deep learning" of a neural network, a training for a processing of pixels in the 565 format with no interpolation may offer clear advantages, since the interpolation has not taken place, as a result of which a substantial loss of information may otherwise occur.

According to one specific embodiment, the input data signals are read in an RGB format or YUV format in the step of reading in, the input data signals being read in, in particular, with a resolution of 12 bits or 16 bits per color channel. The bit depth in this case relates to the number of color shades per color or shades of gray. The raw input data signals from the camera are generally provided in 12-16 bits. This range may be reduced to 8 bits by various transformations adapted over time by the camera control. The adaptation of the 16 bits to 8 bits in this case takes place dynamically within various control loops. In principle, however, a higher resolution of 12-16 bits is available for the artificial intelligence of the neural network.

According to one specific embodiment, at least the step of reading in may be repeated and/or cyclically repeated. An important advantage of neural networks in this regard is that the results of the object identification frequently improve when the scope of the read-in data, as well as the data variability, increase as a result of applying the camera control parameter.

According to one specific embodiment, the neural network may be trained with a step of training to identify an object from the input data signals, the step of training taking place using the camera control parameter. For the training, the relatively simply designed nodes of each layer of the neural network collect data from a large number of adjacent nodes, to which they are coupled via weighted connections and link these data according to simple rules. Although the complexity of the individual nodes is relatively minimal, their interconnection significantly increases the capacity of the neural network as a whole. During the training, the nodes learn to initially read out simple patterns and structures from the raw pieces of information based on hundreds of thousands to millions of examples, and from these patterns and structures, to form increasingly more complex typical features in order to be able to solve the assigned task of object identification.

According to one specific embodiment, the step of reading in may be carried out in a processing unit of a vehicle and/or of a central processing unit of a stationary camera network. Such a specific embodiment of the approach presented herein offers the advantage that a preparation of data in a vehicle-external processing unit and/or in a central processing unit of a stationary camera network means a reduced processing requirement in the vehicle and/or in the camera itself, and allows for an associated lower energy consumption or for the possibility of utilizing resources for other functions. In addition, the vehicle-external processing unit and/or the central processing unit of a stationary camera network has/have a greater available processing capacity than a vehicle-internal and/or camera-internal computer.

According to one specific embodiment, a person and/or a vehicle may be identified as an object in the step of identification. In this step, the method presented is suitable, in particular, for computer vision tasks due to its automated feature extraction such as, for example, object identification and/or person recognition. The neural network learns autonomously during training how the integrated camera control parameter is to be used in order to be able to successfully carry out the object identification.

The approach presented herein further provides a device, which is designed to carry out, activate or implement the steps of a variant of the method presented herein for object detection in corresponding units. With this embodiment variant of the present invention in the form of a device for object identification as well, the object underlying the present invention may be quickly and efficiently achieved.

For this purpose, the device for object identification may include at least one processing unit for processing signals or data, at least one memory unit for storing signals or data, at least one interface to a sensor or to an actuator for reading in sensor signals from the sensor or for outputting data or control signals to the actuator and/or at least one communication interface for reading in or outputting data that are embedded in a communication protocol. The processing unit may, for example, be a signal processor, a microcontroller or the like, the memory unit possibly being a flash memory, an EEPROM or a magnetic memory unit. The communication interface may be designed to read in or output data wirelessly or in a hardwired manner, a communication interface able to read in or output hardwired data being able, for example to read in these data electrically or optically from a corresponding data transmission line or being able to output these data into a corresponding data transmission line.

A device for object identification in the present case may be understood to mean an electrical device that processes sensor signals and outputs control signals and/or data signals as a function thereof. The device for object identification may include an interface, which may be designed in hardware and/or in software. In a hardware design, the interfaces may, for example, be part of a so-called system ASIC, which contains a wide variety of functions of the device for object identification. It is also possible, however, that the interfaces are independent, integrated circuits or are made up at least partially of discrete components. In a software design, the interfaces may be software modules, which are present on a microcontroller, for example, in addition to other software modules.

Also advantageous is a computer program product or computer program having program code, which may be stored on a machine-readable carrier or memory medium, such as a semiconductor memory, a hard disk memory or an optical memory and is used for carrying out, implementing and/or activating the steps of the method according to one of the specific embodiments described above, in particular, when the program product or product is executed on a computer or on a device.

DETAILED DESCRIPTION

Figure 1:
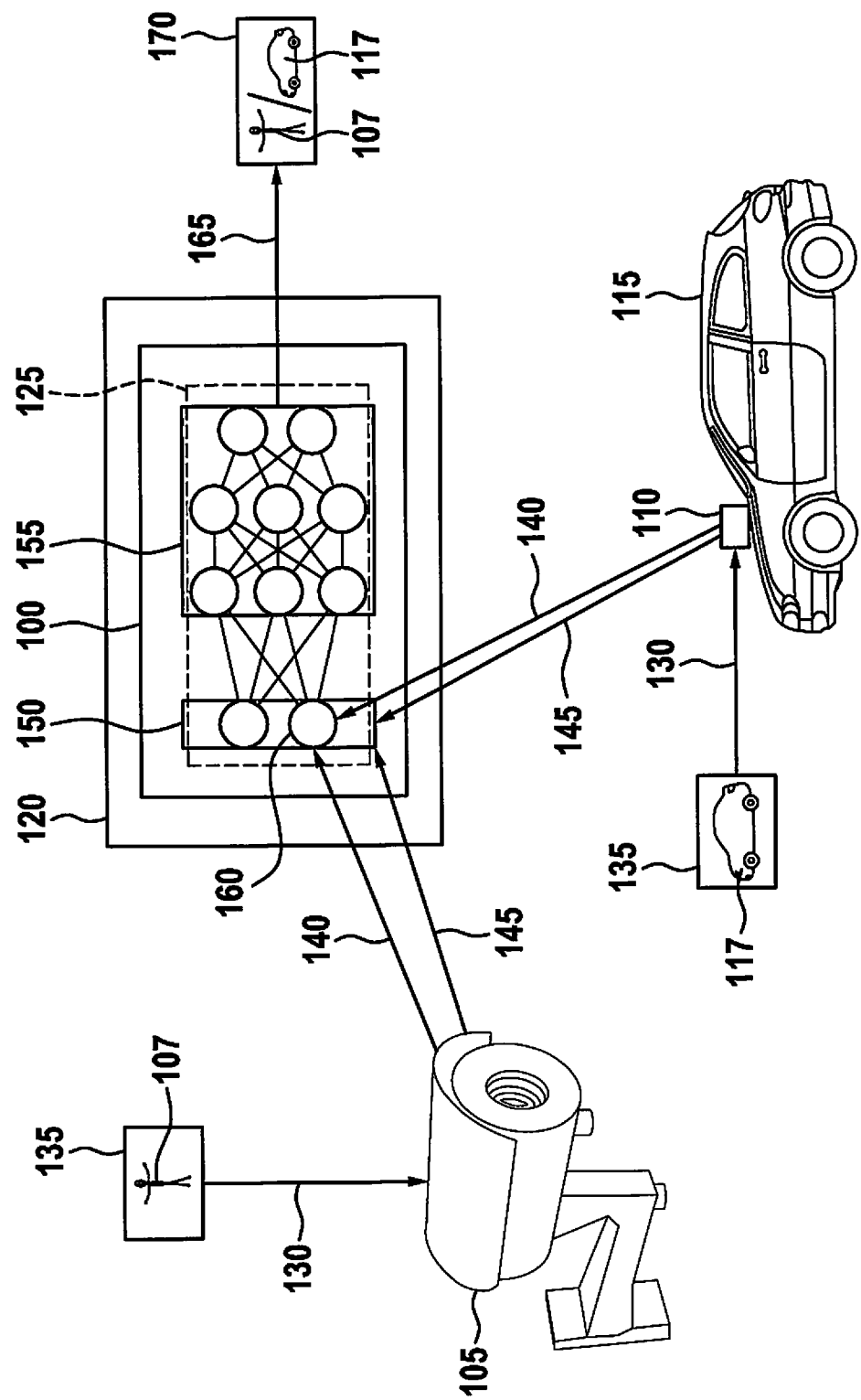
FIG. 1 schematically shows a system configuration for object identification based on a device for object identification according to one exemplary embodiment.

In the following description of preferred exemplary embodiments of the present invention, identical or similar reference numerals are used for elements which are represented in the various figures and act similarly, a repeated description of these elements being omitted.

FIG. 1 schematically shows a system configuration of an object identification based on a device 100 for object identification according to one exemplary embodiment. Since the method approach presented herein may be used both in video-based monitoring technology, as well as in the automotive field, the system configuration initially includes a monitoring camera 105, which is part of a camera network according to one exemplary embodiment, and further a surroundings sensor camera 110, which is mounted as a surroundings sensor on a vehicle 115 and is used to detect surroundings of vehicle 115. The schematic system configuration further includes device 100 for object identification, which is mounted in an external processing unit 120 according to one exemplary embodiment, external processing unit 120 also including an artificial neural network 125.

Monitoring camera 105 detects a conspicuous person 107 in an area to be monitored by monitoring camera 105. Monitoring camera 105 then reads in a plurality of image signals 130, image signals 130 each representing an image 135 of detected person 107 recorded by monitoring camera 105. Monitoring camera 105 is then designed to determine a camera control parameter 140 for adjusting a recording feature of monitoring camera 105 using the plurality of read-in images 135 of person 107. Camera control parameter 140 used in this case may be a brightness and/or a contrast and/or a color reproduction and/or an aperture opening and/or a gain and/or a piece of information about a color correction (tone mapping) and/or a frame repetition rate and/or a piece of information about an exposure time and/or an analog-digital converter adjustment and/or a piece of information about a white balance and/or an infrared filter adjustment and/or a focus adjustment and/or a piece of information about a chronological noise filtering (noise reduction) and/or a pixel error. Monitoring camera 105 provides the plurality of read-in images 135 of person 107 below in the form of a plurality of input data signals 145, as well as camera control parameter 140, to a read-in device 150 of device 110 for object identification.

Surroundings sensor camera 110, which is mounted as a surroundings sensor on vehicle 115, detects an object 117 in the surroundings of vehicle 115. Surroundings sensor camera 110 then reads in a plurality of image signals 130, image signals 130 each representing an image 135 of detected object 117 recorded by surroundings sensor camera 110. Surroundings sensor camera 110 is then designed to determine a camera control parameter 140 for adjusting a recording feature of surroundings sensor camera 110 using the plurality of read-in images 135 of object 117. Camera control parameter 140 used in this case may be a brightness and/or a contrast and/or a color reproduction and/or an aperture opening and/or a gain and/or a piece of information about a color correction (tone mapping) and/or a frame repetition rate and/or a piece of information about an exposure time and/or an analog-digital converter adjustment and/or a piece of information about a white balance and/or an infrared filter adjustment and/or a focus adjustment and/or a piece of information about a chronological noise filtering (noise reduction) and/or a pixel error. Surroundings sensor camera 110 provides the plurality of read-in images 135 of object 117 below in the form of a plurality of input data signals 145, as well as camera control parameter 140, to a read-in device 150 of device 100 for object identification.

Device 100 for object identification includes read-in device 150 and an identification device 155. Read-in device 150 is designed to read in the plurality of input data signals 145, as well as the determined camera control parameter for adjusting a recording feature of camera 150, 110. The plurality of input data signals 145 in this case represents images 135 of person 107 to be identified and/or of object 117 to be identified recorded by at least one of cameras 105, 110, input data signals 145 from monitoring camera 105, as well as from surroundings sensor camera 110 of vehicle 115, being provided to read-in device 150. Read-in device 150 is further designed to apply read-in camera control parameter 140 for reading in at least one additional input data signal 145. Read-in device 150 is further designed to read in each pixel of an image 135 of person 170 to be identified and/or of object 117 to be identified that forms input data signal 145 in a 565 format. Thus, read-in device 150 is also designed to read in input data signals 145 in a RGB format or YUV format, input data signals 145 being read in, in particular, with a resolution of 16 bits per color channel. According to one exemplary embodiment, camera control parameter 140 is coupled to at least one node 160 from a first half of layers of neural network 125. Neural network 125 is made up of a plurality of nodes. These nodes are used to receive pieces of information from the environment or from other nodes and to forward them in modified form to other nodes or to the environment. Finally, identification device 155 is designed to identify person 107 and/or object 117 in neural network 125 using determined camera control parameter 140. Object 117 identified in this case may, in particular, be another vehicle 117. Identification device 155 may identify person 107 and/or object 117, in particular, on the basis of a previous training of neural network 125 using camera control parameter 140. The result of the object identification is then provided in the form of an object output signal 165 to a display unit 170 for displaying identified person 107 and/or identified object 117, object output signal 165 representing a specified percentage, with which probability identified object 117, for example, is a person 107 and/or a vehicle 117. Alternatively, the use of a score is also possible without the use of a probability.

Figure 2:
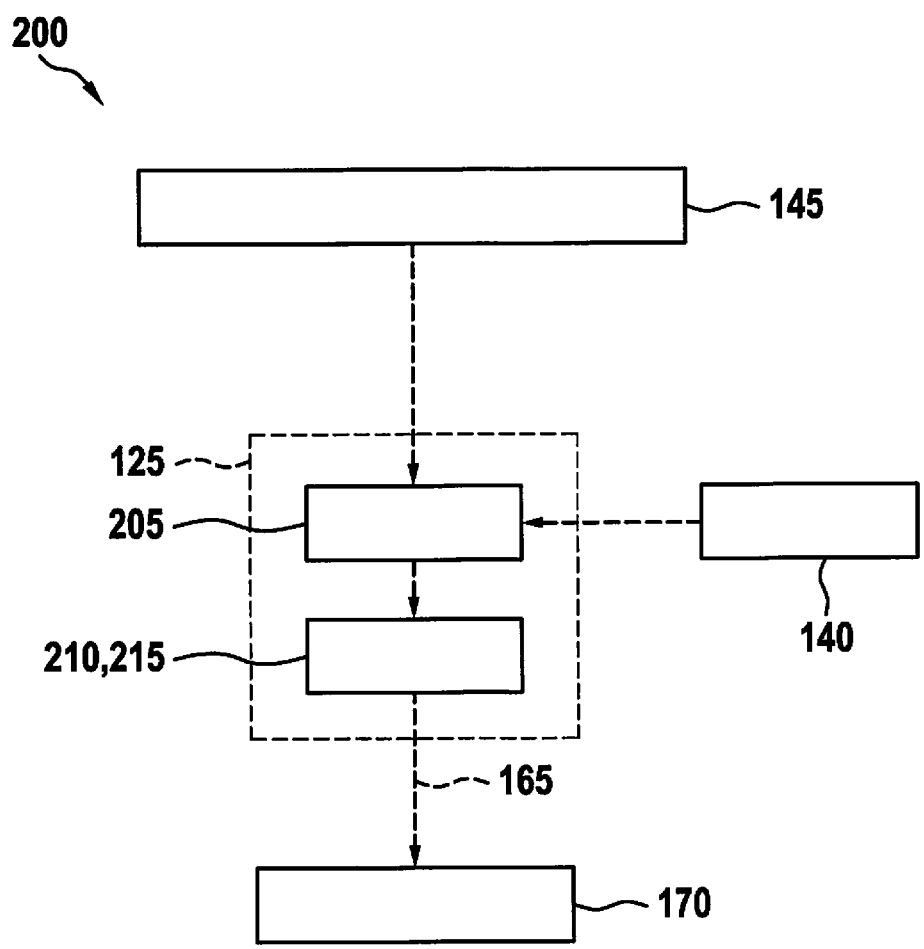
FIG. 2 schematically shows a simplified system sequence of a method for object identification according to one exemplary embodiment.

FIG. 2 schematically shows a simplified system sequence 200 of a method for object identification according to one exemplary embodiment. System sequence 200 includes input data signals 145, camera control parameter 140, an input layer 205 of a neural network 125, an intermediate layer 210 and an output layer 215 of neural network 125, intermediate layer 210 and output layer 215 according to one exemplary embodiment being pictorially combined in FIG. 2, as well as object output signal 165 and display unit 170 for displaying the identified object.

Input data signals 145 represent the images of the object to be identified that are recorded by at least one of the cameras, which are provided, in particular, by a surroundings sensor camera of a vehicle and/or of a monitoring camera. Classic methods for object identification with the aid of a neural network 125 have two-dimensional images (RGB) as input signals 145, which are represented in input layer 205 of neural network 125. A small number of approaches use three-dimensional pieces of information (RGB-D), for example, from point clouds, since modern processing hardware is still limited. In system sequence 200 shown here, input data signals 145 are read in both in a RGB format as well as in a RGB-D format, input data signals 145 being read in, in particular, with a resolution of 16 bits per color channel. The camera control parameter 140 for adjusting a recording feature of the camera may be read in neural network 125 as a so-called early fusion or late fusion or hybrid fusion, camera control parameter 140 being coupled in the case of an early fusion to a node from a first half of layers and in the case of a late fusion to a node from a second half of layers of neural network 125. According to one exemplary embodiment, camera control parameter 140 is already coupled to first input layer 205 of neural network 125. Before the object identification can take place, neural network 125 is trained to identify an object from input data signals 145 using camera control parameter 140. Input layer 205 of neural network 125 is used in this case as a starting point for the information flow. Input data signals 145 and camera control parameter 140 are received by the nodes at the beginning of input layer 205 and at the end are forwarded weighted to the nodes of first intermediate layer 210. In the process, one node of input layer 205 forwards the respective piece of information to all nodes of first intermediate layer 210. At least one intermediate layer 210 is located between input layer 205 and output layer 215 in each neural network 125. The more intermediate layers 210 there are, the deeper neuronal network 125 is, hence, this is also referred to as so-called "deep learning". The number of possible intermediate layers 210 in a neural network 125 is theoretically unlimited. In practice, however, each additional intermediate layer 210 also causes an increase in the requisite processing power necessary for the operation of neural network 125. Output layer 215 is situated behind intermediate layer or intermediate layers 210 and forms the last layer in neural network 125. The nodes situated in output layer 215 are each connected to all nodes of the final intermediate layer 210. Output layer 215 represents the endpoint of the information flow in a neural network 125 and contains the result of the information processing by neural network 125. The result of the information processing is then provided in the form of an object output signal 165 to display unit 170 for representing the identified object, object output signal 165 representing a specified percentage with which probability the identified object is a person or a vehicle, for example. Alternatively, a score (measure of similarity) instead of a probability may be used.

The automatic scene interpretation has been able to make enormous strides in recent years due to increasingly faster hardware and major successes in the field of the previously mentioned "deep learning". In the meantime, information systems from the times prior to "deep learning" are no longer able to keep pace with self-learning methods. "Deep learning" describes a subfield of automatic learning and utilizes artificial neural networks 125, as well as large volumes of data for training an artificial intelligence. In "deep learning", input data are specified, which are annotated with an additional label, for example, vehicle or person, and the algorithms, based on the training material, autonomously learn to identify a vehicle or to segment semantic scene content or to differentiate persons during person recognition. Since the methods operate exclusively data-driven, images from users in the English-speaking world are used by leading computer and software firms for training neural networks 125 in order to achieve a high performance and thus to also be able to successfully evaluate and generalize unseen input images. The input data are recorded by millions of different cameras in cell phones and photo cameras. Thus, a variety of different sensors is available and neural networks 125 are able to successfully operate on data of diverse sensors.

Figure 3:
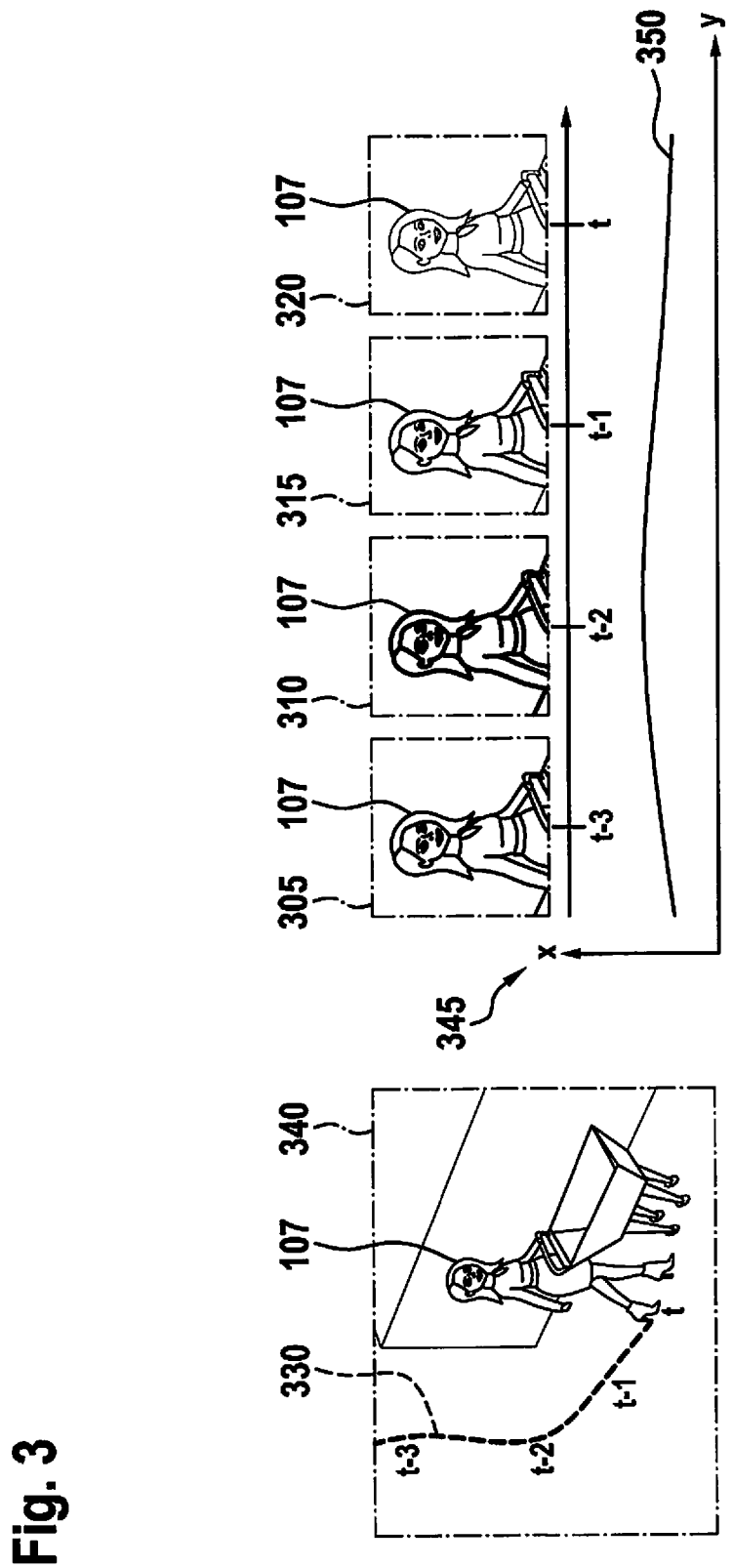
FIG. 3 shows an illustration for explaining the meaning of an active camera control with the aid of a camera control parameter during object identification and/or during person recognition in the video-based monitoring technology according to one exemplary embodiment.

FIG. 3 shows an illustration for explaining the meaning of an active camera control with the aid of a camera control parameter during the identification of an object and/or person recognition in video-based monitoring technology according to one exemplary embodiment. The illustration in this case includes four recorded image details 305, 310, 315, 320, which were recorded by a monitoring camera of a camera network at four different points in time.

A scene is visualized in the image details 305, 310, 315, 320 below, in which the monitoring camera is controlled with the aid of a camera control parameter over time. A person 107 detected by the monitoring camera is visible in image details 305, 310, 315, 320, who is tracked along a movement trajectory 330 over a particular period of time. The enlarged left image 340 shows a superimposed overall scene of four recorded image details 305, 310, 315, 320. The four image details 305, 310, 315, 320 have been recorded each at different points in time, image detail 305 at point in time t−3 having been recorded first, followed by image detail 310 at point in time t−2, followed by image detail 315 at point in time t−1. Image detail 320, recorded at point in time t, shows the most up-to-date image detail. Here it is readily apparent that the colors and the brightness shown in image details 305, 310, 315, 320 change slightly over time. Classic modern approaches for identifying an object and/or for recognizing a person would have problems here, if they intended to recover person 107 in a second monitoring camera of the camera network, since the colors and edge thicknesses in image details 305, 310, 215, 320 vary over time. With the inclusion of the camera control presented here, a neural network may autonomously learn how to handle the camera control and learns that the scene has changed once the camera has been controlled.

Also depicted in FIG. 3 is a function 345 related to the activity of the camera control, the x-axis of which indicating a brightness parameter according to one exemplary embodiment and the y-axis thereof indicating a time line. Graph 350 of function 345 in this case displays an activity of the camera control, in which it becomes clear that the camera control is actively changed for each of the four recorded image details 305, 310, 315, 320 over the time line.

In each recorded image detail 305, 310, 315, 320, a recording feature of the monitoring camera is changed with the aid of a camera control using a particular camera control parameter, so that at points in time t−2, t−1 and t, new data for the training of the object identification are generated with the aid of a neural network. The camera control parameter may be a parameter for adapting a brightness and/or a contrast and/or a color reproduction and/or an aperture opening and/or a gain and/or a pixel error and/or piece of information about a color correction (tone mapping) and/or a frame repetition rate and/or a piece of information about an exposure time and/or an analog-digital converter adjustment and/or a piece of information about a white balance and/or an infrared filter adjustment and/or a focus adjustment and/or a piece of information about a chronological noise filtering (noise reduction) to image details 305, 310, 315, 320.

By actively controlling the camera control with the aid of a camera control parameter, it is also possible to significantly increase the data variability along movement trajectory 330 of person 107. With the artificially enhanced data, it is possible with the aid of neural networks to train more robust models for object identification and/or for person recognition. The active control of the camera control has a direct impact on the representation of the camera image. By interrupting the active camera control, a meaningful data enhancement may no longer take place, which would significantly reduce the accuracy of the object identification and/or person recognition.

Figure 4:
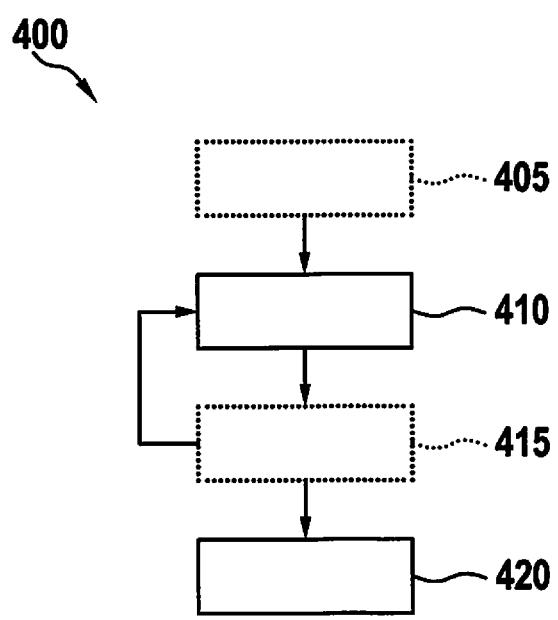
FIG. 4 shows a flow chart of one exemplary embodiment of a method for object identification according to one exemplary embodiment.

FIG. 4 shows a flow chart of one exemplary embodiment of a method 400 for object identification according to one exemplary embodiment. Method 400 may be used for identifying an object using the device presented in FIG. 1.

In a preceding step 405 of method 400, the camera control parameter for adjusting a recording feature of the camera is determined using a plurality of read-in images of an object. The camera control parameter used in this step may be a brightness and/or a contrast and/or a color reproduction and/or an aperture opening and/or a gain and/or a pixel error and/or a piece of information about a color correction (tone mapping) and/or a frame repetition rate and/or a piece of information about an exposure time and/or an analog-digital converter adjustment and/or a piece of information about a white balance and/or an infrared filter adjustment and/or a focus adjustment and/or a piece of information about a chronological noise filtering (noise reduction). Method 400 subsequently includes a step 410 in which a plurality of input data signals as well as the determined camera control parameter are read in for adjusting a recording feature of the camera. In this case, the input data signals represent the images of the object to be identified that are recorded by at least one camera. The camera control parameter may then be applied in step 410 for reading in at least one additional input data signal. Each pixel of an image that forms the input data signal is also read in step 410 in a 565 format (YCbCr, see ITU R BT). In addition, the input data signals are read in a RGB format in step 410 of method 400, the input data signals, in particular, being read in with a resolution of 16 bits per color channel. Finally, the camera control parameter is coupled in step 410 of method 400 to a node from a first half of layers and/or to a node from a second half of layers of the neural network. Step 410 of method 400 is carried out, in particular, in a processing unit of a vehicle and/or of a central processing unit of a stationary camera network and carried out repeatedly or cyclically repeated. Method 400 below includes a step 415, in which the neural network is trained to identify an object from the input data signals. In this case, step 415 takes place using the camera control parameter. Finally, method 400 includes a step 420, in which the object is identified in a neural network using the determined camera control parameter. The object identified in this case may be, in particular, a person and/or a vehicle.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for identifying an object, the method comprising:
   reading in at least one input data signal and a determined camera control parameter for adjusting a recording feature of at least one camera, wherein the input data signal represents at least one image of an object recorded by the camera; and
   identifying the object using the at least one image of the object and the determined camera control parameter, which was used for taking the at least one image of the object, in a neural network based on both the at least one image of the object and the determined camera control parameter.

2. The method as recited in claim 1, further comprising:
   determining the camera control parameter for adjusting a recording feature of the camera using a plurality of read-in images of the object, the determined camera control parameter being used for reading in at least one additional input data signal.

3. The method as recited in claim 1, wherein the determined camera control parameter includes at least one of a brightness and/or a contrast and/or a color reproduction and/or an aperture opening and/or a gain and/or a pixel error and/or a piece of information about a color correction (tone mapping) and/or a frame repetition rate and/or a piece of information about an exposure time and/or an analog-digital converter adjustment and/or a piece of information about a white balance and/or an infrared filter adjustment and/or a focus adjustment and/or a piece of information about a chronological noise filtering and/or noise reduction is used as the camera control parameter.

4. The method as recited in claim 1, wherein in the reading in, the camera control parameter is coupled to at least one of a node from a first half of layers of the neural network and a node from a second half of layers of the neural network.

5. The method as recited in claim 1, wherein in the reading in, each pixel of an image that forms the input data signal is read in an RGB565 color format, the pixels being processed in the step of identifying in the RGB565 color format.

6. The method as recited in claim 1, wherein in the reading in, the input data signals are read in a RGB format or YCbCr, the input data signals being read in with a resolution of 16 bits or 12 bits per color channel.

7. The method as recited in claim 1, wherein at least the reading in is repeated and/or cyclically repeated.

8. The method as recited in claim 1, further comprising:
   training the neural network for identifying the object from the input data signal, the training taking place using the camera control parameter.

9. The method as recited in claim 1, wherein the reading in is carried out in a processing unit of a vehicle and/or in a central processing unit of a stationary camera network.

10. The method as recited in claim 1, wherein in the identifying, a person and/or a vehicle is identified as the object.

11. The method of claim 1, further comprising:
   determining the camera control parameter for adjusting a recording feature of the at least one camera using a plurality of read-in images of the object, the determined camera;
   wherein the determined camera control parameter includes at least one of a brightness, and/or a contrast, and/or a color reproduction, and/or an aperture opening, and/or a gain, and/or a pixel error, and/or a piece of information about a color correction and/or tonal mapping, and/or a frame repetition rate, and/or a piece of information about an exposure time, and/or an analog-digital converter adjustment, and/or a piece of information about a white balance, and/or an infrared filter adjustment, and/or a focus adjustment, and/or a piece of information about a chronological noise filtering and/or noise reduction.

12. The method of claim 11, wherein the determined camera control parameter is coupled to a first input layer of the neural network, so that the neural network can identify an object from the input data signals using the determined camera control parameter.

13. The method of claim 12, wherein the first input layer of the neural network is used in this case as a starting point for the information flow, wherein the input data signals and the determined camera control parameter are received by neural network nodes at a beginning of the input layer and at the end are forwarded to the nodes of a first intermediate layer, and wherein in the process, one node of the input layer forwards a respective piece of information to all nodes of the first intermediate layer, and wherein at least one intermediate layer is located between the input layer and the output layer in the neural network.

14. The method of claim 13, wherein the output layer is situated behind the intermediate layer or intermediate layers and forms a last layer in the neural network, wherein nodes situated in the output layer are each connected to all nodes of a final intermediate layer, wherein the output layer represents an endpoint of information flow in the neural network and contains the result of the information processing by the neural network, and wherein a result of the information processing is provided as an object output signal to a display unit for representing the identified object.

15. A device for identifying an object, comprising:
   an arrangement for reading in at least one input data signal and a determined camera control parameter for adjusting a recording feature of at least one camera, wherein the input data signal represents an image of at least one object recorded by the camera; and
   an arrangement for identifying the object using the at least one image of the object and the determined camera control parameter, which was used for taking the at least one image of the object, in a neural network based on both the at least one image of the object and the determined camera control parameter.

16. The device of claim 15, wherein in the reading in, the camera control parameter is coupled to at least one of a node from a first half of layers of the neural network and a node from a second half of layers of the neural network.

17. A non-transitory machine-readable memory medium, on which a computer program is stored, comprising:
   a program code arrangement having program code for identifying an object, by performing the following the method comprising:
      reading in at least one input data signal and a determined camera control parameter for adjusting a recording feature of at least one camera, wherein the input data signal represents at least one image of an object recorded by the camera; and
      identifying the object using the at least one image of the object and the determined camera control parameter, which was used for taking the at least one image of the object, in a neural network based on both the at least one image of the object and the determined camera control parameter.

18. The non-transitory machine-readable memory medium as recited in claim 17, wherein the machine-readable memory medium includes a non-volatile machine-readable memory medium.

* * * * *